United States Patent Office 2,742,475
Patented Apr. 17, 1956

2,742,475

AZACYCLOALKANES

Karl Hoffmann, Binningen, Ernst Sury, Basel, and Eugen Tagmann, Therwil, Switzerland, assignors to Ciba Pharmaceutical Products, Inc., Summit, N. J.

No Drawing. Application February 20, 1953, Serial No. 338,152

Claims priority, application Switzerland February 26, 1952

8 Claims. (Cl. 260—293.4)

The present invention relates to the manufacture of 3-aryl-3-pyridyl-mono-oxo-1-azacycloalkanes of the formula

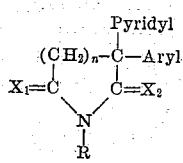

and salts and quaternary compounds thereof, for example, their alkyl pyridinium salts. In the above formula $n$ represents the whole number 1 or 2, R represents hydrogen or an organic radical such as an alkyl group, especially a lower alkyl group, principally methyl or ethyl; an aralkyl group such as a benzyl group, or an acyl radical such as an acetyl-, benzoyl or carbamic acid radical. One of the radicals $X_1$ and $X_2$ represents an oxygen atom and the other two hydrogen atoms. Aryl represents, for example, phenyl or naphthyl, and pyridyl represents more particularly a pyridyl-(2)-radical. The two groups in the 3-position may contain substituents, for example, alkyl groups, or substituted hydroxyl or amino groups or halogen atoms.

The new compounds possess valuable pharmacological properties and can be used as medicaments, especially as anti-convulsive agents.

The aforesaid 3-aryl-3-pyridyl-mono-oxo-1-azacycloalkanes are made by treating a compound of the formula

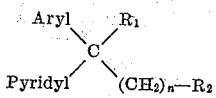

in which one of the radicals $R_1$ and $R_2$ represents a radical convertible by reduction into the group —$CH_2$—NHR, especially a nitrile group, and the other of those radicals represents a carboxyl group or an esterified carboxyl group, and $n$ and R have the meanings given above, with a reducing agent to form a cyclic lactam. The reduction is advantageously carried out with hydrogen in the presence of a catalyst such, for example, as Raney nickel with the addition of ammonia in the presence of a solvent such as alcohol.

In an alternative process, in a compound of the formula

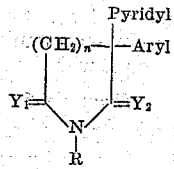

in which $n$ and R have the meanings given above and one of the two radicals $Y_1$ and $Y_2$ represents an oxygen atom and the other represents a group exchangeable for two hydrogen atoms by means of a reducing agent, for example, an oxygen or sulfur atom, this last mentioned radical is replaced by 2 hydrogen atoms by reaction with a reducing agent. The process may be carried out, for example, by treating an aryl-pyridyl-mono-oxo-mono-thio-keto-1-azacycloalkane with Raney nickel in the presence of a solvent.

Azacycloalkanes containing no substituent at the ring nitrogen atom and obtained by the process can be substituted subsequently in the 1-position, such as by reaction with a reactive ester of an alcohol, with an aliphatic diazo-compound, especially diazo-methane or reactive acid derivatives such as acid halides or anhydrides. Reactive esters of alcohols are especially those of strong organic or inorganic acids, such as hydrohalic acids or organic sulfonic acids, such as hydrochloric acid or paratoluene sulfonic acid. The aforesaid subsequent substitution is advantageously carried out in the presence of a condensing agent, which is capable of forming metal compounds with azacycloalkanes, such as alkali or alkaline earth metals, for example, sodium, lithium, calcium, or their amides, hydrides, hydrocarbon compounds or alcoholates, for example, sodamide, sodium hydride, lithium butyl, potassium phenyl, lithium phenyl, potassium tertiary butylate or potassium tertiary amylate.

When in the foregoing reactions compounds containing no substituent at the pyridine nitrogen atom are obtained, they may subsequently be quaternated. As quaternating agents there are used especially reactive esters of alcohols, for example, alkyl halides, such as methyl or ethyl chloride, bromide or iodide, and also dialkyl sulfates, such as dimethyl sulfate or diethyl sulfate, alkyl or aryl sulfonic acid esters such as paratoluene sulfonic acid methyl ester.

Depending on the procedure used there are obtained the new compounds in the form of the free bases or their salts. From the latter there can be obtained in the usual manner the free pyridine or pyridinium bases. From the latter salts can be made by reaction with acids which are suitable for making salts intended for therapeutic use, such, for example, as hydrohalic acids, sulfuric acid, nitric acid, phosphoric acid, thiocyanic acid, acetic aid, propionic acid, oxalic acid, malonic acid, succinic acid, malic acid, methane sulfonic acid, ethane sulfonic acid, hydroxy-ethane sulfonic acid, benzene sulfonic acid or toluene sulfonic acid or therapeutically active acids.

The following examples illustrate the invention, the parts being by weight unless otherwise stated, and the relationship of parts by weight to parts by volume being the same as that of the gram to the cubic centimeter:

Example 1

190 parts of β-phenyl-β-pyridyl-(2)-β-cyano-propionic acid ethyl ester are dissolved in 260 parts by volume of absolute alcohol and shaken with Raney nickel with the addition of ammonia at 50–60° C. in an atmosphere of hydrogen at an initial pressure of 100 atmospheres gauge pressure until the pressure becomes constant. The catalyst is then separated by filtration, the solvent is evaporated under reduced pressure, and the residue is recrystallized from acetone. The resulting 3-phenyl-3-pyridyl-(2')-5-oxo-pyrrolidine of the formula

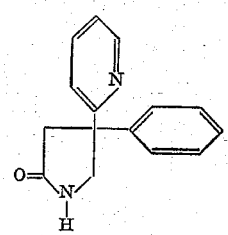

melts at 158–159° C. and forms colorless prisms.

The β-phenyl-β-pyridyl-(2)-β-cyano-propionic acid ethyl ester used as starting material can be made by condensing 149 parts of phenyl-pyridyl-(2)-acetic acid nitrile with 150 parts of bromacetic acid ethyl ester in the presence of 34 parts of sodamide as condensing agent, 650 parts by volume of absolute toluene being used as solvent.

Example 2

43 parts of 3-phenyl-3-pyridyl-(2')-5-oxo-pyrrolidine are dissolved in 400 parts by volume of tetrahydrofurane and boiled with 25 parts of dimethyl sulfate for several hours under reflux. After reprecipitation from a mixture of methanol and ethyl acetate, the 3-phenyl-3-pyridyl-(2')-5-oxo-pyrrolidine methosulfate of the formula

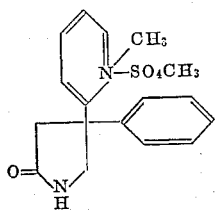

is an easily water-soluble, hygroscopic glassy product.

Example 3

130 parts of γ-phenyl-γ-pyridyl-(2)-γ-cyanobutyric acid methyl ester, 50 parts of Raney nickel and 450 parts by volume of absolute alcohol are treated in a hydrogenating autoclave with dry ammonia gas, and then agitated with hydrogen at an initial 60 atmospheres gauge pressure at a temperature of 40–50° C. for 24 hours until the absorption of hydrogen ceases. The reaction mixture is heated to the boil on the water bath, the catalyst is separated by filtration, the alcoholic solution is cooled, and the 3-phenyl-3-pyridyl-(2')-6-oxo-piperidine of the formula

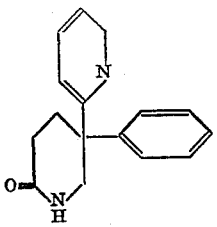

which crystallizes out is separated by filtration. It melts at 183–186° C. after recrystallization from alcohol. The hydrochloride is prepared by dissolving the base in ethyl acetate and introducing gaseous hydrochloric acid. It melts at 215–222° C. after recrystallization from methanol with the addition of ethyl acetate.

The γ-phenyl-γ-pyridyl-(2)-γ-cyano-butyric acid methyl ester used as starting material and boiling at 187–190° C. under 0.4 mm. pressure can be made, for example, from 194 parts by weight of phenyl-piperidyl-(2)-acetic acid nitrile by condensation with 101 parts by weight of acrylic acid methyl ester in 200 parts by volume of dioxane as solvent and 10 parts by volume of trimethyl-benzyl-ammonium hydroxide as condensing agent.

Example 4

38.2 parts of γ-(parachlorophenyl)-γ-pyridyl-(2)-γ-cyano-butyric acid methyl ester, 20 parts of Raney nickel and 500 parts by volume of absolute alcohol are saturated with ammonia gas in a hydrogenating autoclave for two minutes and then agitated with hydrogen at an initial 50 atmospheres gauge pressure for 17 hours at 45–50° C. until the absorption of hydrogen ceases. When the reaction is finished the catalyst is separated by filtration, the alcohol is distilled off under reduced pressure, and the residue consisting of 3-(parachlorophenyl)-3-pyridyl-(2')-6-oxo-piperidine of the formula

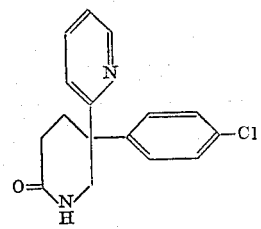

is recrystallized from ethyl acetate with the addition of ligroin. It melts at 189–193° C. The hydrochloride obtainable therefrom as described in Example 3, melts at 240–250° C. after recrystallization from methanol with the addition of a small amount of water.

The γ-(parachlorophenyl)-γ-pyridyl-(2)-γ-cyano-butyric acid methyl ester boiling at 187–192° C. under 0.8 mm. pressure used as starting material in this example can be made for example, by condensing 68.7 parts by weight of parachlorophenyl-pyridyl-(2)-acetic acid nitrile with 31 parts by weight of acrylic acid methyl ester in the presence of 25 parts by volume of trimethyl-benzyl-ammonium hydroxide as catalyst and, for example, 150 parts by volume of dioxane as solvent.

Example 5

20 parts of Raney nickel are added to 33.7 parts of α-phenyl-α-pyridyl-(2)-γ-cyano-butyric acid methyl ester dissolved in 450 parts by volume of absolute alcohol, and dry ammonia gas is introduced under a gauge pressure of 8 atmospheres for 2 minutes into the mixture in a high pressure hydrogenating autoclave. The reaction mixture is then agitated for 7 hours with hydrogen under an initial gauge pressure of 50 atmospheres until the reaction is finished. The catalyst is separated by filtration, the solvent is evaporated under reduced pressure, and the residue is recrystallized from alcohol with the addition of ethyl acetate and ligroin. The resulting 3-phenyl-3-pyridyl-(2')-2-oxo-piperidine of the formula

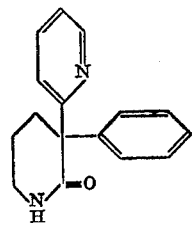

melts at 167–170° C.

The hydrochloride thereof is prepared as described in Example 3 and melts at 186–193° C. after recrystallization from methanol with the addition of ethyl acetate.

The α-phenyl-α-pyridyl-(2)-γ-cyano-butyric acid methyl ester used as starting material in this example and melting at 69–71° C. can be prepared, for example, from 42 parts by weight of phenyl-pyridyl-(2)-acetic acid methyl ester by condensation with 12 parts by weight of acrylic acid nitrile in the presence of 5 parts by volume of trimethyl-benzyl-ammonium hydroxide as catalyst and 150 parts by volume of dioxane as solvent at a reaction temperature of 80–90° C. followed by recrystallization of the reaction product from ethyl acetate with the addition of ligroin.

Example 6

100 parts of 3-phenyl-3-pyridyl-(2')-2,5-dioxopyrrolidine are dissolved in 400 parts by volume of dry pyridine and refluxed at 120–130° C. for 2 hours with 200 parts of finely powdered phosphorus pentasulfide. After cooling, the reaction mixture is poured into ice water and the red oil extracted with chloroform or ethyl acetate or ether. The extract is washed with a dilute solution of sodium carbonate and then with water and the solvent then evaporated and the residue recrystallized, e. g. from a mixture of ether and petroleum ether. The 3-phenyl-3-pyridyl-(2')-2-oxo-5-thio-keto-pyrrolidine of the formula

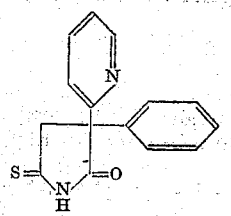

is thus obtained in the form of yellow prisms melting at 125–126° C.

15.7 parts of 3-phenyl-3-pyridyl-(2')-2-oxo-5-thio-keto-pyrrolidine are boiled under reflux for 3 hours with 150 parts of Raney nickel in 300 parts by volume of methanol. The nickel is then removed by filtration, the solvent evaporated under reduced pressure and the residue recrystallized from acetone. The resulting 3-phenyl-3-pyridyl-(2')-2-oxo-pyrrolidine of the formula

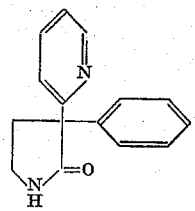

form colorless prisms which melt at 167–168° C.

The 3-phenyl-3-pyridyl-(2')-2,5-dioxo-pyrrolidine used as starting material is described and claimed in application of Karl Hoffmann and Ernst Sury Ser. No. 333,826 filed January 28, 1953, for Dioxo-Pyrrolidines. It can be obtained as follows:

115 parts by weight of 2-phenyl-2-pyridyl-(2')-butane-1:4-diacid-mononitrile-(1) are dissolved with heating in 250 parts by volume of concentrated aqueous ammonia. The solution is evaporated to a syrupy consistency in a water pump vacuum and then carefully heated under normal pressure to a maximum of 260° C. Ammonia and water are briskly evolved in this operation. When the evolution of ammonia is complete, the whole is allowed to cool and the imide produced dissolved in methanol, filtered through carbon, the solvent evaporated to the commencement of crystallization and in this manner 104 parts by weight obtained of 3-phenyl-3-pyridyl-(2')-2:5-dioxo-pyrrolidine of the formula

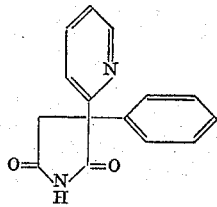

It melts at 128° C. and forms colorless prisms which dissolve in concentrated ammonia, in sodium carbonate solution and in hydrochloric acid.

The aforementioned 2-phenyl-2-pyridyl-(2')-butane-1:4-diacid-mononitrile-(1) of decomposition point 97–108° C. can be prepared, for example, by alkaline hydrolysis of 89 parts by weight of 2-phenyl-2-pyridyl-(2')-butane-1:4-diacid-monoethyl ester mononitrile-(1) dissolved in 250 parts by volume of methanol by means of 28 parts by weight of potassium hydroxide in 50 parts by volume of water, the latter melts at 87–88° C., boils at 180–183° C. under 0.1 mm. pressure and can be produced by condensation of 149 parts by weight of phenyl-pyridyl-(2)-acetic acid nitrile with 150 parts by weight by bromacetic acid ethyl ester in the presence of 34 parts by weight of sodamide as condensing agent.

Example 7

23.8 parts of 3-phenyl-3-pyridyl-(2')-5-oxo-pyrrolidine are dissolved in 250 parts by volume of absolute toluene, boiled while stirring for 4 hours at 120–130° C. with 4.3 parts of pulverized sodamide, and then cooled to 60° C. There are then added dropwise at 60–80° C. in the course of 15 minutes 13 parts of dimethyl carbamic acid chloride, dissolved in 50 parts by volume of toluene and the whole then stirred for 4 hours at 110–120° C.

After cooling, activated carbon is added, the toluene solution filtered, the filtrate evaporated under reduced pressure, and the residue recrystallized from acetone. The 1-dimethyl-carbamyl-3-phenyl-3-pyridyl-(2')-5-oxo-pyrrolidine of the formula

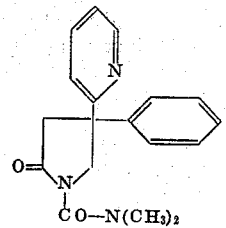

is obtained in very good yield, and forms colorless prisms which melt at 151.5–152° C.

Example 8

7.93 parts by weight of 3-phenyl-3-pyridyl-(2')-2-oxo-pyrrolidine are dissolved in 100 parts by volume of absolute toluene, heated while stirring for 2 hours at 120–130° C. with 1.4 parts by weight of sodamide, and then cooled to 40° C. There are then added dropwise in the course of 10 minutes 40 parts by weight of dimethyl-carbamic acid chloride, dissolved in 10 parts by volume of toluene, and the whole then stirred for 3 hours at 120° C. After cooling, the toluene solution is washed with water, dried with calcium chloride, and the residue distilled under reduced pressure. The resulting 1-dimethyl-carbamyl-3-phenyl-3-pyridyl-(2')-2-oxo-pyrrolidine of the formula

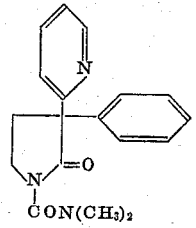

boils at 236–238° C. under 0.2 mm. pressure.

Example 9

12.6 parts of 3-phenyl-3-pyridyl-(2')-6-oxo-piperidine, dissolved in 100 parts by volume of toluene, are boiled with 2.1 parts of sodamide while stirring for 2 hours at 120–130° C. with reflux cooling. The reaction mixture is then cooled to 0° C. and 8 parts of acetyl chloride, dissolved in 20 parts by volume of toluene added dropwise. After boiling under reflux for 1 hours undissolved portions are removed by filtration, the filtrate evaporated under reduced pressure and the residue distilled under a high vacuum. The resulting 1-acetyl-3-phenyl-3-pyridyl-(2')-6-oxo-piperidine of the formula

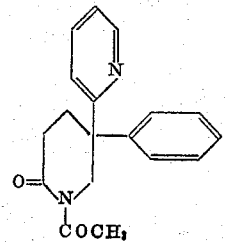

boils at 223–225° C. at 0.2 mm. pressure. It is a highly viscous oil.

What is claimed is:

1. A compound selected from the group consisting of 3-R-3-pyridyl-(2′)-monoxo-1-azacycloalkanes, the salts, and the quaternary ammonium compounds thereof, which in the form of the free base can be represented by the following formula:

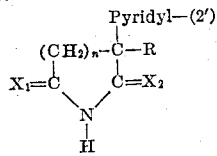

in which $n$ is an integer selected from the group consisting of 1 and 2, R is a member selected from the group consisting of phenyl and halogenophenyl, and one of $X_1$ and $X_2$ represents an oxygen atom and the other represents two hydrogen atoms.

2. 3-phenyl-3-pyridyl-(2′)-2-oxo-pyrrolidine.
3. 3-phenyl-3-pyridyl-(2′)-5-oxo-pyrrolidine.
4. 3 - phenyl-3-pyridyl-(2′)-5-oxo-pyrrolidine quaternary ammonium salts.
5. 3-phenyl-3-pyridyl-(2′)-6-oxo-piperidine.
6. 3-phenyl-3-pyridyl-(2′)-2-oxo-piperidine.
7. 3 - (p - chlorophenyl) - 3-pyridyl-(2′)-6-oxo-piperidine.
8. 3 - phenyl - 3 - pyridyl-(2′)-2-oxo-5-thio-keto-pyrrolidine.

References Cited in the file of this patent

UNITED STATES PATENTS

| | | |
|---|---|---|
| 2,524,643 | Walter et al. | Oct. 3, 1950 |
| 2,555,353 | Lucas et al. | June 5, 1951 |